(12) United States Patent
Lok

(10) Patent No.: US 7,610,482 B1
(45) Date of Patent: Oct. 27, 2009

(54) METHOD AND SYSTEM FOR MANAGING BOOT TRACE INFORMATION IN HOST BUS ADAPTERS

(75) Inventor: Ying P. Lok, Ladera Ranch, CA (US)

(73) Assignee: QLogic, Corporation, Aliso Viejo, CA (US)

( * ) Notice: Subject to any disclaimer, the term of this patent is extended or adjusted under 35 U.S.C. 154(b) by 555 days.

(21) Appl. No.: 11/477,161

(22) Filed: Jun. 28, 2006

(51) Int. Cl.
G06F 9/00 (2006.01)
G06F 15/177 (2006.01)

(52) U.S. Cl. .............. 713/2; 713/1; 714/23; 714/36

(58) Field of Classification Search .......... 713/1, 713/2; 714/36, 23
See application file for complete search history.

(56) References Cited

U.S. PATENT DOCUMENTS

| | | | |
|---|---|---|---|
| 5,163,052 A * | 11/1992 | Evans et al. .............. 714/31 |
| 6,381,694 B1 * | 4/2002 | Yen ............................ 713/2 |
| 6,463,531 B1 * | 10/2002 | Aguilar et al. ............... 713/2 |
| 6,697,962 B1 * | 2/2004 | McCrory et al. ........... 714/27 |
| 6,915,343 B1 * | 7/2005 | Brewer et al. .............. 709/224 |
| 7,225,245 B2 * | 5/2007 | Gurumoorthy et al. ...... 709/223 |
| 7,225,327 B1 * | 5/2007 | Rasmussen et al. ........... 713/2 |
| 7,243,222 B2 * | 7/2007 | Rothman et al. .............. 713/1 |
| 7,315,962 B2 * | 1/2008 | Neuman et al. .............. 714/36 |
| 2003/0070115 A1 * | 4/2003 | Nguyen et al. ............... 714/23 |
| 2004/0267708 A1 * | 12/2004 | Rothman et al. .............. 707/3 |
| 2006/0036851 A1 * | 2/2006 | DeTreville .................. 713/159 |
| 2006/0075276 A1 * | 4/2006 | Kataria et al. ................ 714/4 |

* cited by examiner

Primary Examiner—Thomas Lee
Assistant Examiner—Vincent T Tran
(74) Attorney, Agent, or Firm—Klein, O'Neill & Singh, LLP

(57) ABSTRACT

Method and system for managing boot trace information is provided. The system includes a utility module executed by a computing system processor that enables boot trace collection in a host bus adapter, wherein the utility module enables boot trace collection for different software modules and boot trace information is stored in a designated area of a non-volatile memory, if hardware initialization fails; if firmware loading is unacceptable; if BIOS initialization is unacceptable; and if target discovery is improper.

13 Claims, 5 Drawing Sheets

| Name | Size | Definition |
|---|---|---|
| boot trace level | [0-255] | 0-(default) |
| driver boot trace enable | [0-1] | 0 = disable (default), 1 = enable |
| driver boot trace clr on init | [0-1] | 0 = disable (default), 1 = enable |
| bios boot trace enable[0-1] | | 0 = disable (default), 1 = enable |
| bios boot trace clr on init | [0-1] | 0 = disable (default), 1 = enable |
| efi boot trace enable [0-1] | | 0 = disable (default), 1 = enable |
| efi boot trace clr on init | [0-1] | 0 = disable (default), 1 = enable |
| fcode boot trace enable | [0-1] | 0 = disable (default), 1 = enable |
| fcode boot trace clr on init | [0-1] | 0 = disable (default), 1 = enable |
| boot trace buffer addr lo | [0-65535] | address (low) of the flash trace buffer |
| boot trace buffer addr hi | [0-65535] | address (high) of the flash trace buffer |
| boot trace buffer len lo | [0-65535] | length (low) of the trace buffer |
| boot trace buffer len hi | [0-65535] | length (high) of the trace buffer |

FIG. 2C

METHOD AND SYSTEM FOR MANAGING BOOT TRACE INFORMATION IN HOST BUS ADAPTERS

BACKGROUND

1. Field of the Invention

The present invention relates to computing systems, and more particularly, to managing and storing boot trace information in network adapters.

2. Background of the Invention

Conventional computing systems typically include several functional components. These components may include a central processing unit (CPU), main memory, input/output ("I/O") devices, and streaming storage devices (for example, tape drives). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computing system is often referred to as a host system.

Host systems are used in various applications and environments, including networks and storage area networks ("SAN"). SANs are commonly used to store and access data. SAN is a high-speed sub-network of shared storage devices, for example, disks and tape drives.

Host systems often communicate with storage systems via a host bus adapter ("HBA", may also be referred to as a "controller" and/or "adapter") using an interface, for example, the "PCI" (or PCI-X/PCI-Express) bus interface. The standard bus specifications are incorporated herein by reference in their entirety.

Various standard protocols are used to facilitate host system communication with SAN devices. Fibre Channel is one such standard. Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users. The Fibre Channel standards are incorporated herein by reference in their entirety.

Host systems use a set executable code, called "boot code" to install an operating system, for example, Windows® to start operating the system. Boot code can be stored locally in host memory or it can be acquired from a storage device that is connected to a SAN. If boot code is accessed from a SAN connected device, it is referred to as SAN boot.

Booting from SAN is advantageous, but comes with complications. For example, there are dedicated Fibre Channel HBAs connected to fabric switches often in complex configurations. If a failure occurs during SAN boot, it is very difficult to troubleshoot.

For example, in Windows® operating environment, to troubleshoot boot installation, a Microsoft Kernel Debugger is used. However, a standard operating system CD may not have any way to enable the debugger. A user has to copy the entire operating system CD image to a hard drive, modify certain files, enable the debugger and then re-create the operating system image. Thereafter, a debugging system is setup and connected with a serial cable, before installation can start.

When the operating system is not fully functional, during boot error, the host system simply provides some encrypted information and crash code. This makes it difficult to access boot errors.

A similar de-bugging problem occurs when basic input/output operating system (BIOS) code; extended firmware interface code (EFI) or any other code that a HBA executes from its read only memory during host system initialization. Currently, messages can only be displayed on a display device, but as the code executes, the messages simply scroll away.

Therefore, there is a need for a method and system to better manage boot trace information.

SUMMARY OF THE PRESENT INVENTION

In one aspect of the present invention, a system for managing boot trace information is provided. The system includes a utility module executed by a computing system processor that enables boot trace collection in a host bus adapter, wherein the utility module enables boot trace collection for different software modules and boot trace information is stored in a designated area of a non-volatile memory, if hardware initialization fails; if firmware loading is unacceptable; if BIOS initialization is unacceptable; and if target discovery is improper.

In another aspect of the present invention, a method for managing boot trace information is provided. The method includes enabling boot trace collection in a host bus adapter, wherein a utility module enables boot trace collection for different software modules; saving boot trace information in a designated area of a non-volatile memory, if hardware initialization fails; saving boot trace information in a designated area of the non-volatile memory, if firmware loading is unacceptable; saving boot trace information in a designated area of the non-volatile memory, if BIOS initialization is unacceptable; and saving boot trace information in a designated area of the non-volatile memory, if target discovery is improper.

In another aspects of the present invention, computer-executable process steps stored on computer-readable media for managing boot trace information in a host bus adapter are provided. The process steps include code for enabling boot trace collection in a host bus adapter, wherein a utility module enables boot trace collection for different software modules; code for saving boot trace information in a designated area of a non-volatile memory, if hardware initialization fails; code for saving boot trace information in a designated area of the non-volatile memory, if firmware loading is unacceptable; code for saving boot trace information in a designated area of the non-volatile memory, if BIOS initialization is unacceptable; and code for saving boot trace information in a designated area of the non-volatile memory, if target discovery is improper.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 2C shows an example of boot trace parameters, used according to one aspect of the present invention.

DETAILED DESCRIPTION OF THE PREFERRED EMBODIMENTS

To facilitate an understanding of the preferred embodiment, the general architecture and operation of a system using storage devices will be described. The specific architecture and operation of the preferred embodiment will then be described with reference to the general architecture.

Figure 1A:
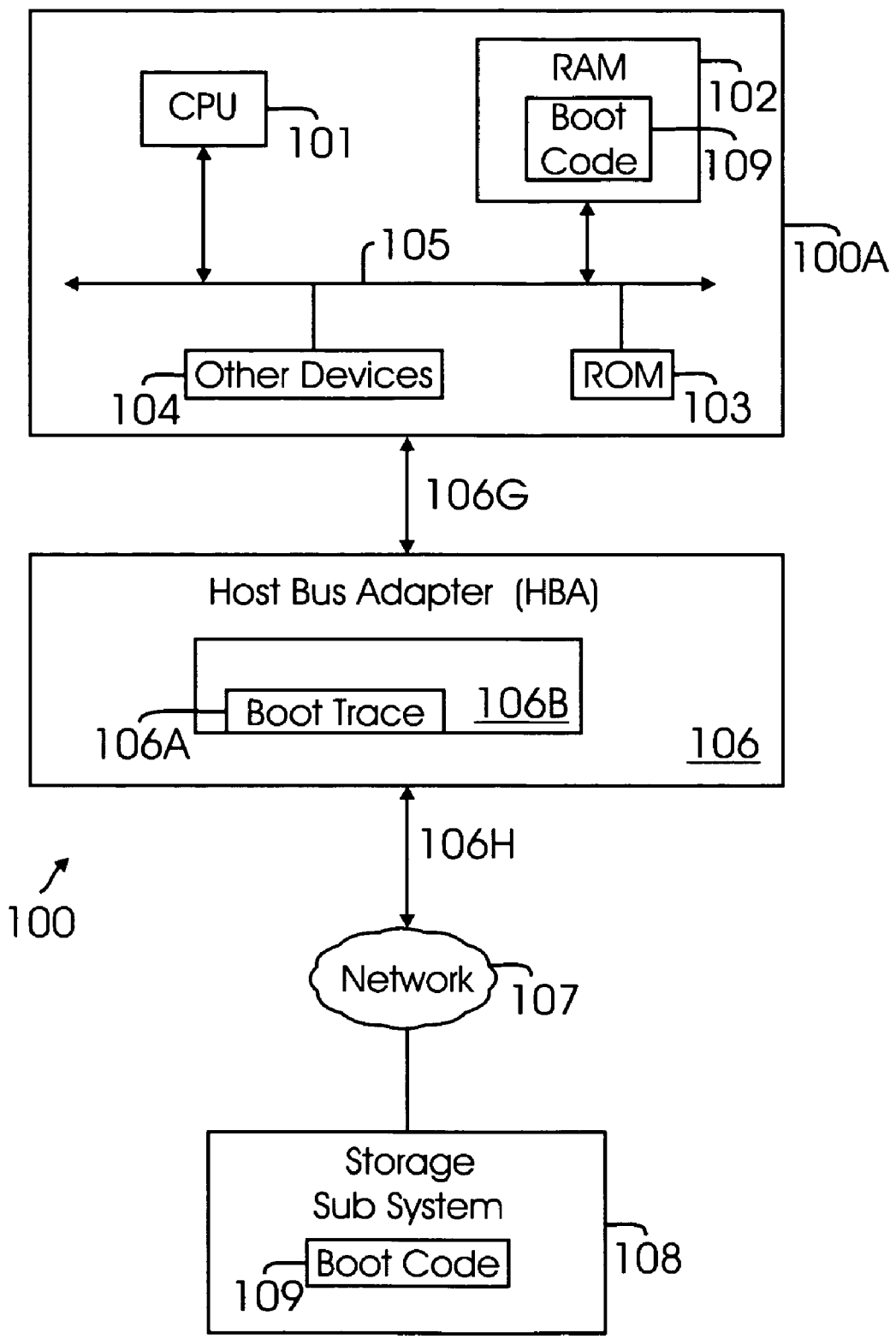
FIG. 1A shows a top-level block diagram of a system using a HBA, according to one aspect of the present invention.

FIG. 1A shows a block diagram of system 100. System 100 includes a host computing system 100A (may also be referred to as host system) with a central processing unit 101 that executes program instructions out of memory 102 that may be random access memory (RAM). Read only memory 103 is also provided to store invariant instruction sequences such as start-up instruction sequences or basic input/output operating system (BIOS). Other devices (shown as 104) for example, a display device, mouse, and/or keyboard are also attached to bus 105.

Host system 100A interfaces with HBA 106. HBA 106 is used to interface host system 100A with storage system 108 via network 107 (for example, a SAN, used interchangeably throughout this specification).

Boot code 109 can be physically stored in storage system 108. Boot code 109 is made available to CPU 101 that executes boot code 109 from RAM 102. HBA 106 is used to store boot trace information in a memory buffer 106A, according to one aspect of the present invention, as described below in detail.

Figure 1B:
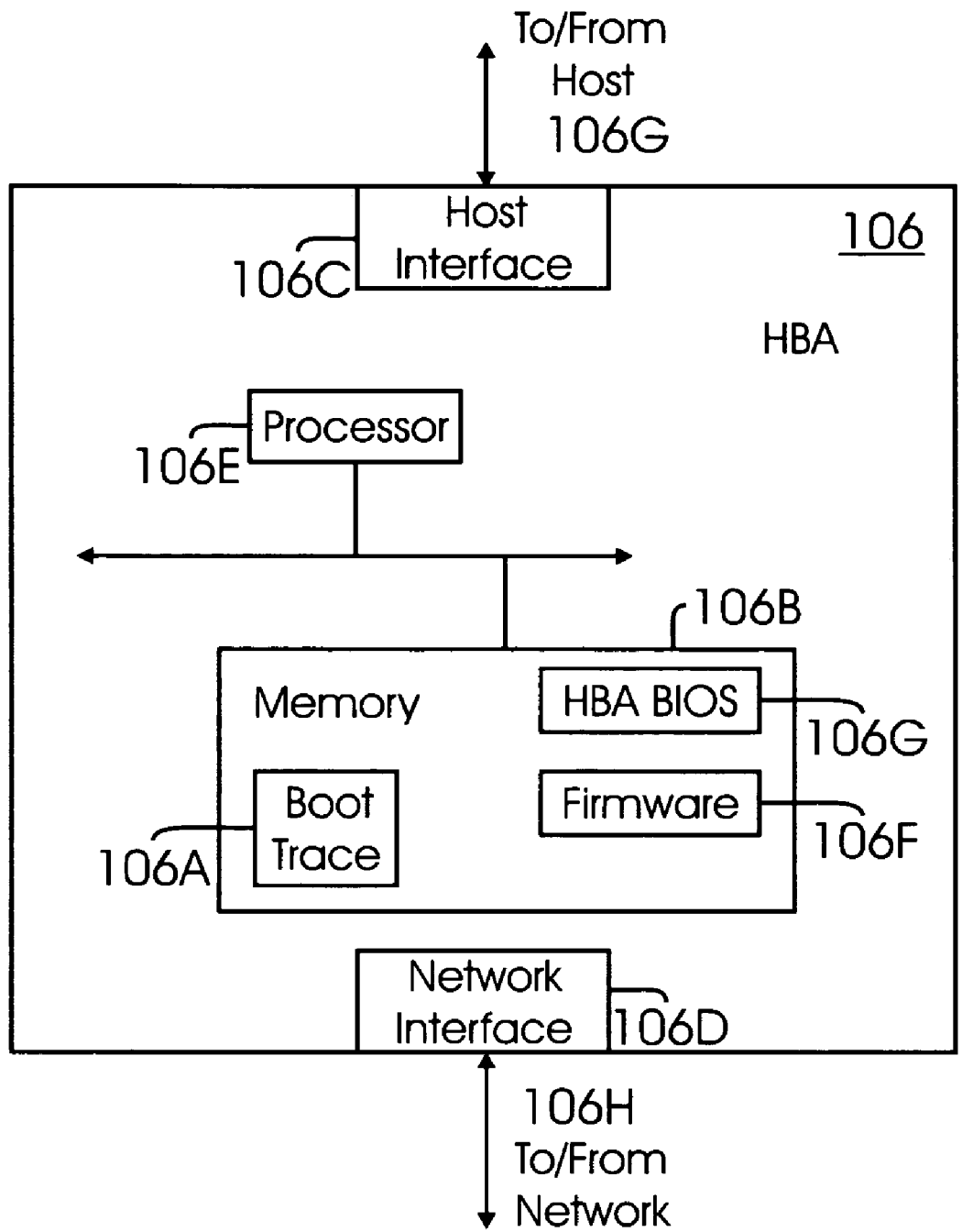
FIG. 1B shows top-level block diagram of a HBA used according to one aspect of the present invention.

FIG. 1B shows a top-level diagram of HBA 106 that interfaces with host system 100A via host interface 106C and a bus 106G. Bus 106G can be a PCI, PCI-X, PCI-Express or any other standard/non-standard bus. The bus specifications are incorporated herein by reference in their entirety. Host interface 106C is customized to handle the type of bus that is being used and performs standard interface functions, for example, signal conversion and others.

HBA 106 communicates with other networked devices via a network interface 106D and network link 106H. Different standard network protocols can be used to facilitate this communication. For example, Fibre Channel, iSCSI, Infiniband and others can be used. The protocol standards are incorporated herein by reference in their entirety. Network interface 106D is customized to handle these different protocols.

HBA 106 has processor 106E that executes firmware instructions 106F to control the overall operations of HBA 106. Processor 106E can be a reduced instruction set computer (RISC) or any other processor.

Processor 106E has access to non-volatile memory 106B, which stores firmware code (106F), HBA basic input output instructions (BIOS) 106G, extended firmware interface code (EFI) and other information (for example, FCODE). These codes are different for different operating systems, for example, Windows®, Linux, Solaris® and others. As discussed above, the de-bugging problems also arise when BIOS 106G, EFI and FCODE are being executed during host system boot process.

Memory 106B also stores boot trace information (in buffer 106A), when host system 100A is executing boot code 109, as described below in detail.

When boot tracing is enabled, each read only memory (ROM) code (i.e. BIOS, EFI, FCODE and driver) reads boot-tracing information from a designated memory buffer. If boot trace is enabled for each type of code (described below with respect to FIG. 2C) with a specified trace level, the ROM code/driver writes trace data onto a buffer location (106A) in memory 106B. In one aspect, trace data includes ASCii strings so that it can be displayed easily.

Figure 2A:
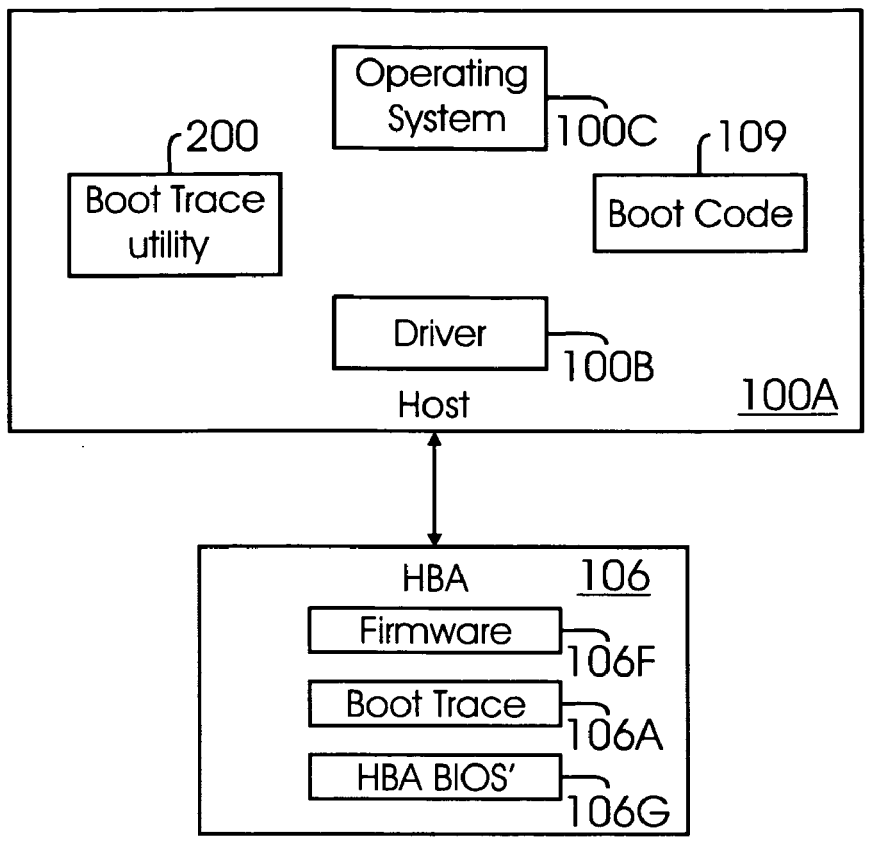
FIG. 2A shows a top-level block diagram of a software architecture used according to one aspect of the present invention.

FIG. 2A shows a block diagram of the overall software architecture that allows host system 100A to interface with various networked devices. Host system 100A has an operating system 100C, which may be Windows®, Linux or any other operating system. It is noteworthy that the present invention is not based on any particular operating system. Boot code 109 is used to boot/initialize operating system 100C before host system 100A becomes functional.

A driver (HBA driver) 100B interfaces between operating system 100C and host bus adapter firmware code 106F. Typically, firmware code 106F resides in a non-volatile memory of HBA 106, as shown in FIG. 1B.

Figure 2B:
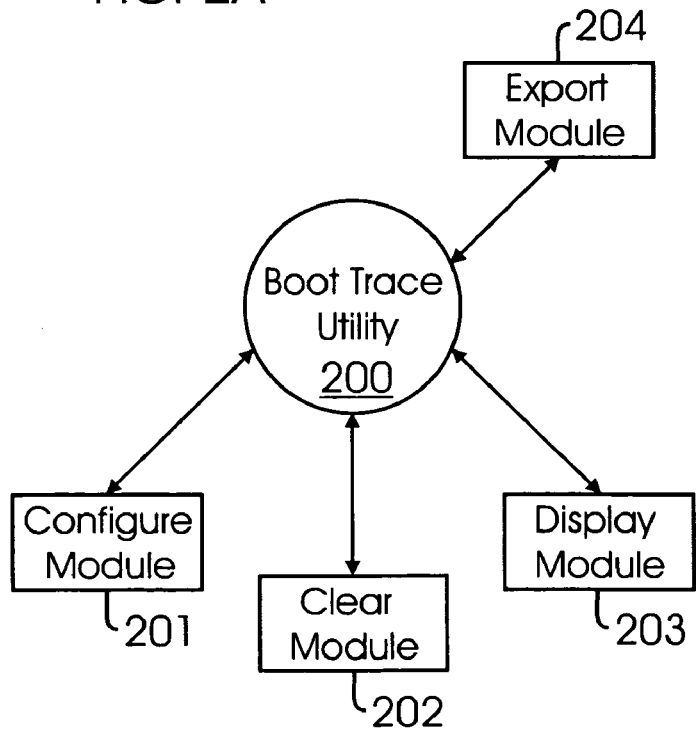
FIG. 2B shows a block diagram of a boot trace utility, according to one aspect of the present invention.

Boot trace utility 200 (may also be referred to as "utility module" "utility 200") enables HBA 106 to collect boot trace information. Boot trace information can be ported from memory buffer 106A using utility module 200, as described below. FIG. 2B shows a top-level block diagram of utility module 200 that includes a configuration module 201, clear module 202, display module 203 and an export module 204.

Configure module 201 is used to configure HBA 106 to collect boot trace information and store boot trace information in buffer 106A. Trace information stored in non-volatile memory 106B is cleared by clear module 202. Display module 203 displays boot trace interface to a user on a display device for example, a monitor. Export module 204 is used to port or move boot trace information from buffer 106A to another device.

It is noteworthy that utility module 200 operates as a user interface allowing a user to easily view, manage and display boot trace information.

Figure 3:
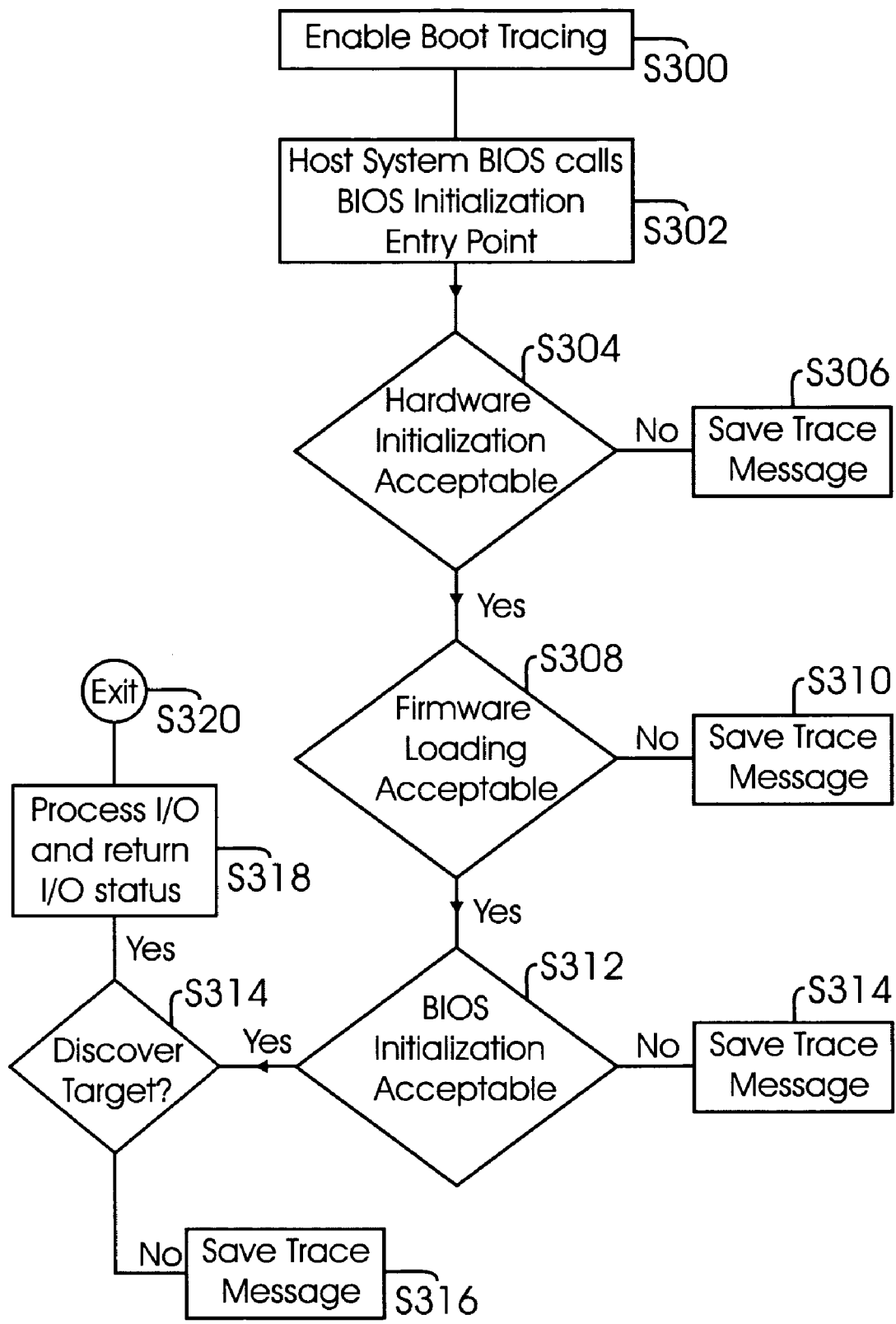
FIG. 3 shows a flow diagram for boot tracing, according to one aspect of the present invention.

FIG. 3 shows a process flow diagram for using utility module 200 and managing boot information, according to one aspect of the present invention.

The process starts in step S300, when boot tracing is enabled. In one aspect, setting a register bit in memory 106B enables boot tracing. Since HBA 106 operates in different operating system environments, a different bit may be set for different software components, for example, FCODE, EFI or BIOS.

FIG. 2C shows an example of boot trace configuration parameters 205. Memory 106B has a dedicated segment that stores boot configuration information/parameters. The boot trace level 206 can be programmed that determines how much boot information should be stored. Boot trace for driver, BIOS, EFI or FCODE can be enabled/disabled by setting a bit value (shown in segment 207).

The bit values for "bios boot clr on init", "efi boot trace clr on init"; and "fcode boot clr on init" (also shown in segment 207) clear the buffer (106A) that stores boot trace information for HBA driver 100B, BIOS (also shown as bios in FIG. 2C), EFI (also shown as efi in FIG. 2C) and FCODE (also shown as fcode in FIG. 2C).

Segment 208 provides memory addresses where boot trace information is stored. This is helpful when boot trace information is being retrieved or ported. It is noteworthy that the example of FIG. 2C have been provided to illustrate the adaptive aspects of the present invention and not to limit the invention to any particular bit value, command name, memory address and others.

Referring back to FIG. 3, in step S302, host system 100A BIOS calls for BIOS initialization entry point. In S304, host system 100A determines if hardware initialization is acceptable/proper. If hardware initialization is not proper, then in step S306, the trace message is stored in a dedicated area of non-volatile memory.

If hardware initialization is acceptable, then in step S308, host system 100A determines if firmware loading is acceptable. If not, then trace message is stored in step S310 in assigned memory space.

If loading is acceptable, then in step S312, host system 100A determines if BIOS initialization is acceptable. If not, then in step S314, trace messages with respect to BIOS initialization is saved in assigned memory buffer.

In step S314, host system 100A determines if a target has been discovered. If not, then trace messages are saved in step S316. If a target has been properly discovered, then in step S318 an input/output request is serviced and a status report is sent. Thereafter, the process ends in step S320.

It is noteworthy that although the foregoing example has been provided with respect to HBAs, the boot trace collection process/utility can be used in any other system/environment.

In one aspect of the present invention, a utility can configure boot trace collection by a HBA. Boot trace information can be displayed or transferred to another system for analysis.

Although the present invention has been described with reference to specific embodiments, these embodiments are illustrative only and not limiting. Many other applications and embodiments of the present invention will be apparent in light of this disclosure and the following claims.

What is claimed is:

1. A method for managing boot trace information, comprising:
 configuring a host bus adapter for collecting boot trace information for a plurality of modules during a boot operation;
 wherein the plurality of modules include basic input and output system (BIOS) code, extended firmware interface code (EFI) and a host bus adapter driver executed by the host system;
 wherein a utility module sets a level for each of the plurality of modules based on which boot trace information for each of the plurality of modules is collected;
 enabling boot trace collection in the host bus adapter, wherein the utility module enables boot trace collection for the plurality of modules;
 saving boot trace information in a designated area of the non-volatile memory of the host bus adapter, if hardware initialization fails;
 saving boot trace information in a designated area of the non-volatile memory of the host bus adapter, if host bus adapter firmware loading is unacceptable;
 saving boot trace information in a designated area of the non-volatile memory of the host bus adapter, if a BIOS host system initialization is unacceptable; and
 saving boot trace information in a designated area of the non-volatile memory of the host bus adapter, if target discovery is improper.

2. The method of claim 1, wherein the utility module sets different trace levels for each of the plurality of modules.

3. The method of claim 1, wherein the utility module configures boot trace buffers that are cleared upon initialization.

4. The method of claim 1, wherein the utility module defines memory addresses where boot trace information is stored at the non-volatile memory of the host bus adapter.

5. A system for managing boot trace information, comprising:
 a utility module executed by a computing system processor that:
 (a) configures a host bus adapter for collecting boot trace information for a plurality of modules during a boot operation;
 wherein the plurality of modules include basic input and output system (BIOS) code, extended firmware interface code (EFI) and a host bus adapter driver executed by the host system; and
 wherein the utility module sets a level for each of the plurality of modules based on which boot trace information for each of the plurality of modules is collected; and
 (b) enables boot trace collection in the host bus adapter, wherein the utility module enables boot trace collection for the plurality of modules and boot trace information is stored in a designated area of a non-volatile memory of the host bus adapter, if hardware initialization fails; if firmware loading is unacceptable; if BIOS initialization is unacceptable; and if target discovery is improper.

6. The system of claim 5, wherein the utility module sets different trace levels for each of the plurality of modules.

7. The system of claim 5, wherein the utility module configures boot trace buffers that are cleared upon initialization.

8. The system of claim 5, wherein the utility module defines memory addresses where boot trace information is stored at the non-volatile memory of the host bus adapter.

9. The system of claim 5, wherein the utility module defines memory addresses where boot trace information is stored at the non-volatile memory of the host bus adapter.

10. Computer-executable process steps stored on computer-readable media for managing boot trace information, comprising:
 code configuring a host bus adapter for collecting boot trace information for a plurality of modules during a boot operation;
 wherein the plurality of modules include basic input and output system (BIOS) code, extended firmware interface code (EFI) and a host bus adapter driver executed by the host system;
 wherein a utility module sets a level for each of the plurality of modules based on which boot trace information for each of the plurality of modules is collected;
 code for enabling boot trace collection in the host bus adapter, wherein the utility module enables boot trace collection for the plurality of modules;
 code for saving boot trace information in a designated area of a non-volatile memory of the host bus adapter, if hardware initialization fails;
 code for saving boot trace information in a designated area of the non-volatile memory of the host bus adapter, if host bus adapter firmware loading is unacceptable;
 code for saving boot trace information in a designated area of the non-volatile memory of the host bus adapter, if a BIOS host system initialization is unacceptable; and
 code for saving boot trace information in a designated area of the non-volatile memory of the host bus adapter, if target discovery is improper.

11. Computer-executable process steps of claim 10, wherein the utility module sets different trace levels for each of the plurality of modules.

12. Computer-executable process steps of claim 10, wherein the utility module configures boot trace buffers that are cleared upon initialization.

13. Computer-executable process steps of claim 10, wherein the utility module defines memory addresses where boot trace information is stored at the non-volatile memory of the host bus adapter.

* * * * *

UNITED STATES PATENT AND TRADEMARK OFFICE
CERTIFICATE OF CORRECTION

PATENT NO. : 7,610,482 B1 Page 1 of 1
APPLICATION NO. : 11/477161
DATED : October 27, 2009
INVENTOR(S) : Ying P. Lok It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 676 days.

Signed and Sealed this

Twelfth Day of October, 2010

David J. Kappos
*Director of the United States Patent and Trademark Office*